No. 771,652. PATENTED OCT. 4, 1904.
C. J. MACOMBER & G. H. GUTHRIE.
FRICTION CLUTCH.
APPLICATION FILED JUNE 16, 1903.
NO MODEL. 2 SHEETS—SHEET 2.

WITNESSES:

INVENTORS
Charles J. Macomber
George H. Guthrie
BY
ATTORNEYS

No. 771,652.                                    Patented October 4, 1904.

UNITED STATES PATENT OFFICE.

CHARLES JOHN MACOMBER AND GEORGE HIRAM GUTHRIE, OF MUNCIE, INDIANA.

FRICTION-CLUTCH.

SPECIFICATION forming part of Letters Patent No. 771,652, dated October 4, 1904.

Application filed June 16, 1903. Serial No. 161,705. (No model.)

*To all whom it may concern:*

Be it known that we, CHARLES JOHN MACOMBER and GEORGE HIRAM GUTHRIE, both citizens of the United States, and residents of Muncie, in the county of Delaware and State of Indiana, have invented a new and Improved Friction-Clutch, of which the following is a full, clear, and exact description.

The object of the invention is to provide a new and improved friction-clutch which is simple and durable in construction, very effective when in use, and arranged to insure an easy running of the pulley when not in frictional contact with the clutch members, and to allow a positive driving of the pulley and shaft when the clutch is in action.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in all the views.

Figure 1:
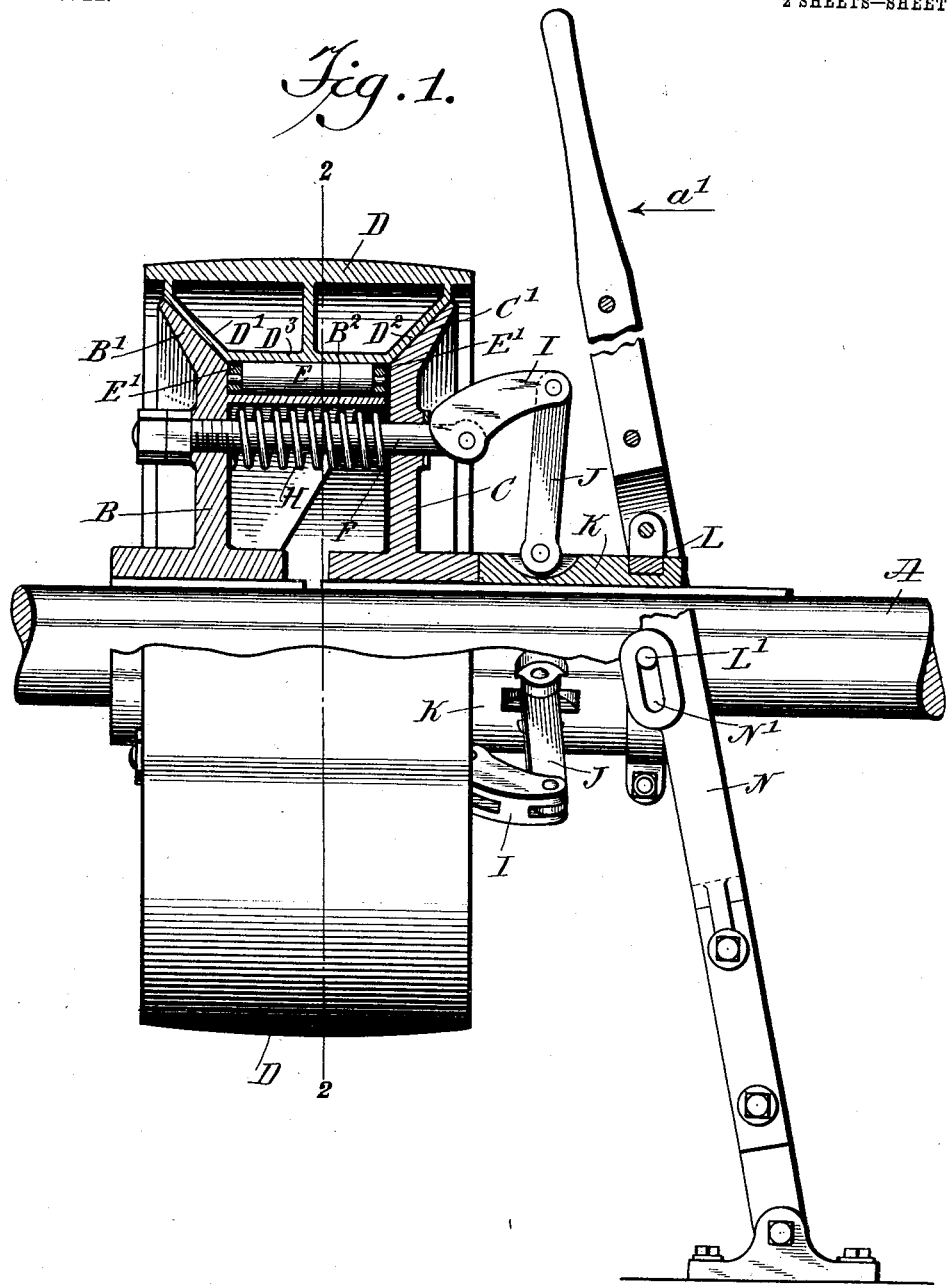
Figure 2:
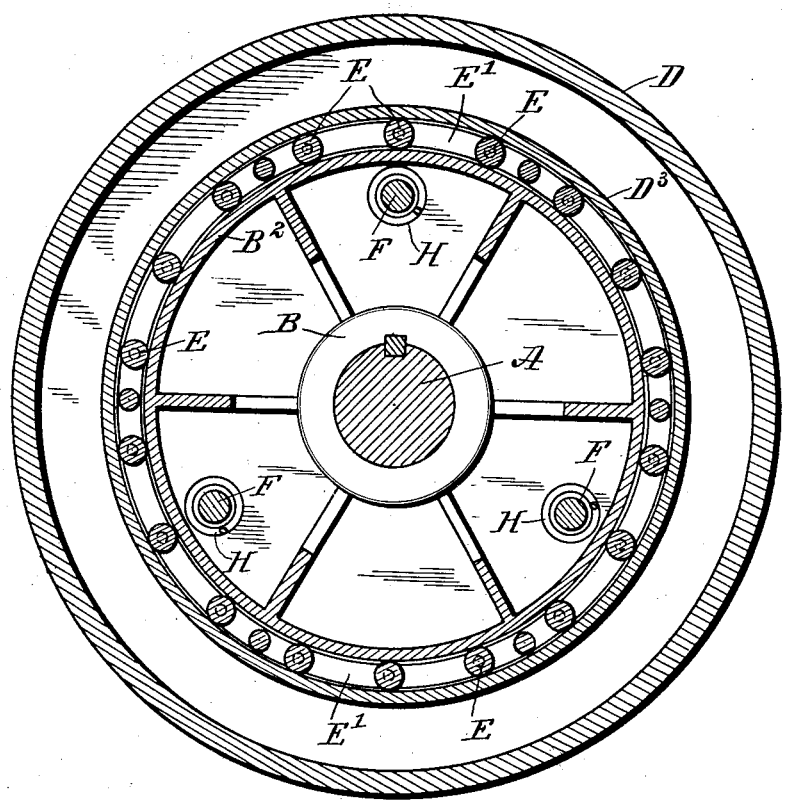
Figure 3:
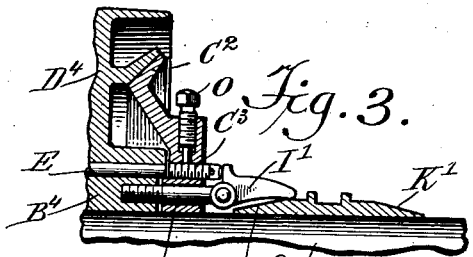

Figure 1 is a longitudinal sectional elevation of the improvement, parts being shown in elevation. Fig. 2 is a transverse section of the same on the line 2 2 in Fig. 1, and Fig. 3 is a sectional side elevation of a modified form of the improvement.

On a shaft A is keyed or otherwise secured a fixed clutch member B, and on the said shaft, adjacent to the fixed clutch member B, is mounted to slide but to turn with the shaft a movable clutch member C, and the said clutch members B and C are provided at their outer ends with annular angular clutch-faces B' and C', respectively, adapted to engage corresponding faces D' and D², arranged on the web of a pulley D, mounted to turn on the rollers E of the roller-bearing, so as to insure an easy running of the pulley D when the clutch is not in action. The rollers E of the roller-bearing are journaled at their ends in a ring-frame E', preferably consisting of two rings rigidly connected with each other by screws and bars, as plainly indicated in Fig. 2, and the rollers E of the roller-bearing are mounted to travel on a rim B², formed or held integrally on the fixed clutch member B, as plainly shown in the drawings. Thus the rollers E are interposed between the flat face D³ of the web of the pulley and the rim B² of the fixed clutch member B. Now in order to lock the pulley D to the clutch members it is necessary to move the clutch member C lengthwise on the shaft A toward the other clutch member B, so that the clutch-faces B' and C' firmly engage the faces D' and D² on the pulley D. Normally the clutch member C is held in an outermost position, so as to allow the pulley D to rotate freely on its roller-bearing supported by the clutch member B.

The means for moving the clutch member C toward and from the fixed clutch member B are as follows: On the fixed clutch member B is secured a plurality of longitudinally-extending studs or pins F, on each of which is coiled a spring H, resting with one end against the clutch member B and pressing with its other end aginst the clutch member C, so as to normally hold the clutch member C apart from the clutch member B to keep the clutch out of action. On each outer end of a stud or pin F is pivoted a cam-lever I, adapted to engage with its cam end the outer face of the movable clutch member C, so as to move the latter inwardly against the tension of the springs H and toward the other clutch member B to clamp the pulley D firmly between the clutch members B and C. The outer ends of the cam-levers I are pivotally connected by links J with a sleeve K, mounted to slide on and to rotate with the shaft A, and the said sleeve K is engaged by a shifting-collar L, provided with trunnions L', engaging elongated slots N' in a shifting-lever N under the control of the operator. Now when the operator swings the lever N inward in the direction of the arrow *a'* then the sleeve K is shifted from the right to the left and the links J impart a swinging motion to the several cam-levers I, so that the latter by their cam ends act on the movable clutch member C to shift the latter inward toward the other fixed clutch member B and against the tension of the springs H to clamp the pulley D between the clutch members B and C to insure a positive driving of the connected parts—that is, the rotary motion given to the shaft A is transmitted by the clutch members B and C to the pulley D and the rotary motion given to the pulley D is transmitted by the clutch members B and C to the shaft A. When it is desired to move the clutch out of action, then the operator simply swings the lever N in the inverse direction of the arrow $a'$, so that the sleeve K is moved from the left to the right and the cam-levers I are swung inward for their cam ends to gradually move out of engagement with the movable clutch member C, so that the springs H force the clutch member C away from the clutch member B, thus breaking the frictional contact between the clutch-faces B' and C' with the faces D' and $D^2$ of the pulley D.

In the modified form (shown in Fig. 3) the sleeve K' is movable lengthwise on the shaft A' and is provided with an incline $K^2$, engaging the bell-crank lever I', fulcrumed on the stud or pin F', secured to the fixed clutch member $B^4$ and extending loosely through the movable clutch member $C^2$, carrying an adjustable screw rod or pin $C^3$ for the bell-crank lever I' to press against to move the clutch member $C^2$ lengthwise for the clutch members $B^4$ and $C^2$ to firmly clamp the pulley $D^4$, as above described, for the several parts to rotate together. A set-screw O may be employed to fasten the pin $C^3$ in place.

The friction-clutch described is very simple and durable in construction, is not liable to easily get out of order, and is arranged to insure an easy running of the pulley D when the clutch is out of action and to insure a positive connection of the several parts to insure proper transmission of the power.

Having thus described our invention, we claim as new and desire to secure by Letters Patent—

1. A friction-clutch, comprising a pulley having angular clutch-faces, a clutch member fixed on a shaft at one side of the pulley, said clutch member having an angular clutch-face and an annular inwardly-projecting bearing-flange, a second clutch member mounted on the other side of the pulley to turn with and to slide on the shaft, a roller-bearing between the pulley and bearing-flange of the fixed clutch member, pins secured to the fixed clutch member and extending loosely through the movable clutch member, springs arranged on the pins between the clutch members and normally holding them out of engagement with the pulley, and means connected with the pins for drawing the clutch members toward each other against the action of the springs to bring them into engagement with the pulley, as set forth.

2. A friction-clutch, comprising a clutch member fixed to a shaft and having an annular inwardly-projecting flange, a second clutch member mounted to turn with and to slide on the shaft, pins secured to the fixed clutch member and extending loosely through the movable clutch member, springs on the pins between the clutch members, cam-levers pivoted to the ends of the pins, an operating-lever, a connection between the operating-lever and cam-levers, and a pulley mounted between the clutch members on the flange of the fixed section, as set forth.

3. A friction-clutch, comprising a clutch member fixed on a shaft and having an angular clutch-face and an annular and inwardly-projecting bearing flange or rim, a second clutch member mounted to turn with and to slide lengthwise on the shaft, toward and from the other fixed clutch member, the movable clutch member having an angular clutch-face, a pulley having angular clutch-faces adapted to be engaged by the faces of the clutch members, the pulley also having a flat face on its web, a roller-bearing between the flange or rim of the fixed clutch-section and the flat face of the web of the pulley, and means substantially as described for imparting movement to the said movable clutch member, to slide the same on the shaft, the said means comprising pins secured to the fixed clutch member and extending loosely through the movable clutch member, springs on the pins between the clutch members for pressing the movable clutch member outward, cam-levers fulcrumed on the outer ends of the pins and adapted to engage the said movable clutch member, and means under the control of the operator for imparting a swinging motion to the said cam-levers, as set forth.

4. A friction-clutch, comprising a clutch member fixed on the shaft and having an angular clutch-face and an annular and inwardly-projecting flange or rim, a second clutch member mounted to turn with the shaft and to slide on the same, said second clutch member having an angular clutch-face, a pulley having angular clutch-faces adapted to be engaged by the faces of the clutch members, a roller-bearing between the rim or flange of the fixed clutch member and the pulley, pins secured to the fixed clutch members and extending loosely through the movable clutch member, springs on the pins between the members, cam-levers pivoted to the outer ends of said pins, a sleeve mounted to slide on the shaft, links connecting the sleeve with the cam-levers, a collar engaging the sleeve and provided with trunnions, and a lever provided with slots receiving the said trunnions as set forth.

In testimony whereof we have signed our names to this specification in the presence of two subscribing witnesses.

CHARLES JOHN MACOMBER.
GEORGE HIRAM GUTHRIE.

Witnesses:
C. H. KELLY,
ERNEST SNIDER.